United States Patent [19]

Hsieh

[11] Patent Number: 5,799,624
[45] Date of Patent: *Sep. 1, 1998

[54] ELECTROLYTIC FUELING SYSTEM FOR ENGINE

[76] Inventor: Wen-Chan Hsieh, Suite 1, 11F, 95-8 Chang Ping Road Sec.1, Taichung, Taiwan

[*] Notice: The terminal 18 months of this patent has been disclaimed.

[21] Appl. No.: 381,276

[22] Filed: Jan. 31, 1995

Related U.S. Application Data

[63] Continuation of Ser. No. 85,617, Jul. 2, 1993, abandoned.
[51] Int. Cl.$^6$ .................................................. F02B 43/08
[52] U.S. Cl. .................... 123/3; 123/DIG. 12; 123/1; 204/129
[58] Field of Search ...................... 123/3, DIG. 12; 204/129, 272

[56] References Cited

U.S. PATENT DOCUMENTS

| | | | |
|---|---|---|---|
| 4,113,601 | 9/1978 | Spirig | 204/272 |
| 4,442,801 | 4/1984 | Glynn et al. | 123/3 |
| 4,458,634 | 7/1984 | Carr et al. | 123/3 |
| 4,573,435 | 3/1986 | Shelton | 123/3 |
| 5,105,773 | 4/1992 | Cunningham et al. | 123/DIG. 12 |
| 5,159,900 | 11/1992 | Dammann | 204/129 |

*Primary Examiner*—Erick R. Solis

[57] ABSTRACT

An electrolytic fueling system for engine comprises generally a water tank, an electrolyte, a segregator, an acetone container, an automatic air valve, a pressure control device and a multi-point antibackfire device connected by a number of conduits or passage therein between for producing dried and purified gas of hydrogen and oxygen to run a generic combustion engine. The improvement of this disclosure is characterized in adapting a plurality of cup shaped water absorbing sintered alloy blocks which are of different size and sequentially nested in the electrolyte and interlocked with the anodes and cathodes of the power source. The electrolyte in which the blocks immerse is a mixture of fresh water and potassium hydroxide (KOH) in predetermined proportion. So that a limitless surface contacting area is therefore constituted in between the sintered alloy blocks and the electrolyte to generate a large amount of mixed gas of hydrogen and oxygen which is then dried and purified through the segregator and the actone container prior to exiting out via the air valve and entering into the engine.

9 Claims, 3 Drawing Sheets

ELECTROLYTIC FUELING SYSTEM FOR ENGINE

This is a continuation application of an U.S. application Ser. No. 08/085,617 filed Jul. 2, 1993, now abandoned.

BACKGROUND OF THE INVENTION

The present invention relates to a fueling system for engine, more particularly to an electrolytic fueling system to produce gas of hydrogen and oxygen instead of the conventional vaporized gasoline to start an engine, which utilizes water absorbing sintered alloy blocks incorporated with a hydrolysis method to generate adequate gas of hydrogen and oxygen therein.

Conventional vaporized gasoline fueling systems for engines or generators are known to create a great deal of waste gas of carbon monoxide (CO) and hydrocarbon (CxHy) which not only cause environmental pollution but also jeopardize the ozonosphere around the earth. Scientists and engineers around the world are trying hard during recent years to search for substitute resources for vaporized gasoline in order to eliminate environmental pollution so as to develop battery or solar engine systems. Some of the countries encourage their drivers to use natural gas instead of gasoline to run their cars. But it is still facing a lot of problems of limitation, especially the solar engine system which is not adaptable in raining seasons.

SUMMARY OF THE PRESENT INVENTION

The main object of the present invention is to provide an electrolytic fueling system for an engine or generator by utilizing the water absorbing sintered alloy blocks incorporated with a hydrolysis method which enables an unlimited contact surface in between the electrolyte and the electrode to speed up their active chemical reaction in generating adequate gas of hydrogen and oxygen for running an engine without creating the waste gas.

Another object of this invention is to provide an electrolytic fueling system by adapting the electrolyte of mixed potassium hydroxide (KOH) and fresh water instead of petroleum chemical product in order to reduce the cost of application.

Accordingly, the present invention of an electrolytic fueling system comprises generally a fresh water tank, a KOH tank, an electrolyzer, a segragator, an acetone container, an air valve, a pressure control device and a multi-point antibackfire device thereof. The most significant improvement of this invention is characterized in adapting a plurality of cup shaped water absorbing sintered alloy blocks spacedly arranged inside the electrolyzer, which are made of particles of nickel alloy and moulded under high pressure with instant heat treatment in a high frequency furnace or by a maximum current instant short circuit discharging method at a temperature of about 1500°~2000° C. The particles are so tightly arranged inside the mould as each one of them must contacts with twelve others on their outer peripheries and puncture each other under high pressure and high temperature prior to curdle into dimensionally different cup shaped blocks.

The electrolyte inside the electrolyzer is a mixture of potassium hydoxide (KOH) and fresh water in predetermined proportion which is supplied from the water and KOH tanks under control of an ingress valve. Four dimensionally different cup shaped blocks are arranged upside down on the bottom of the electrolyzer to form four layers in the manner that they are sequentially surrounded by themselves one by one as the largest one of them is at the outmost position. A pair of 12-volt batteries are adapted to electrically connect with the four layer of the blocks in the manner that the first and third layers are connected with the postive poles and the second and fourth layers are connected with the negative poles of the electrode.

Because of that the electrolyte is in weak alkalinity and the molecules of the water and KOH are sizably smaller than the crevices inside the whole block so that the blocks are entirely permeable in the electrolyte in a preferable electrolysis condition.

When the power is set on in maximum current, both ionic hydrogen and ionic oxygen are generated from the electrolyte as the ionic oxygen trends to the cathode and the ionic hydrogen trends to the anode of the electrode and then they conduct a neutralized reaction in the blocks prior to become mixture of vaporized gas of hydrogen and oxygen belching out of the outmost block. The mixture then ascends through a plurality of drip plates entered into the segregator for a process of dehydration and goes up continuously through the acetone container for decarbonizing and cooling off prior to becoming a dried and purified gas of hydrogen and oxygen gathering at the air valve which is under control of a micro computer will transfer the gas entered into the cylinders of an engine after it sequentially passes through the pressure control device, the multi-point antibackfire device and an air ingress.

The gas under high pressure will be combustioned by the sparks and exploded inside the cylinders to run the engine in proper speed without exhausting the waste gas except the vapor out of the engine.

The objects and advantages of the present invention will become more apparent by reference to the following description thereof when read in conjunction with the attached drawings.

DETAILED DESCRIPTION OF THE PREFERRED EMBODIMENT OF THE PRESENT INVENTION

Figure 1:
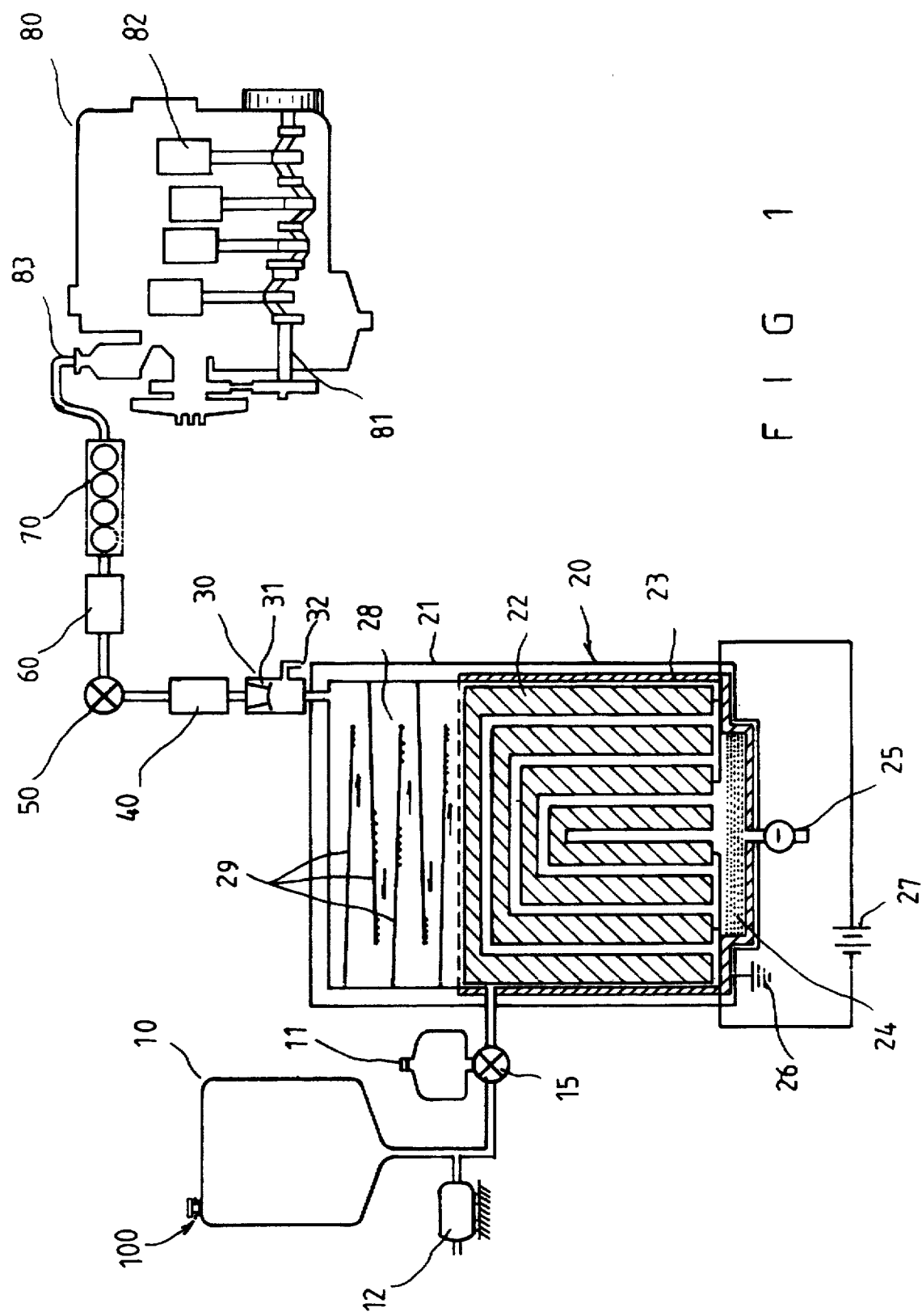
FIG. 1 is a schematic diagram to show the preferred embodiment of the present invention.

Referring to FIG. 1 of the drawings, the present invention of an electrolytic fueling system for engine comprises generally a recruiting unit 100 composed of a fresh water tank 10 incorporated with a KOH tank 11, an automatic pump 12, a three-port valve 15 and a plurality of conduits 16 intercommunicated thereinbetween, an electrolyzer 20, a segregator 30, an acetone container 40, an automatic air valve 50, a pressure control device 60 and a multi-point antibackfire device 70.

Figure 2:
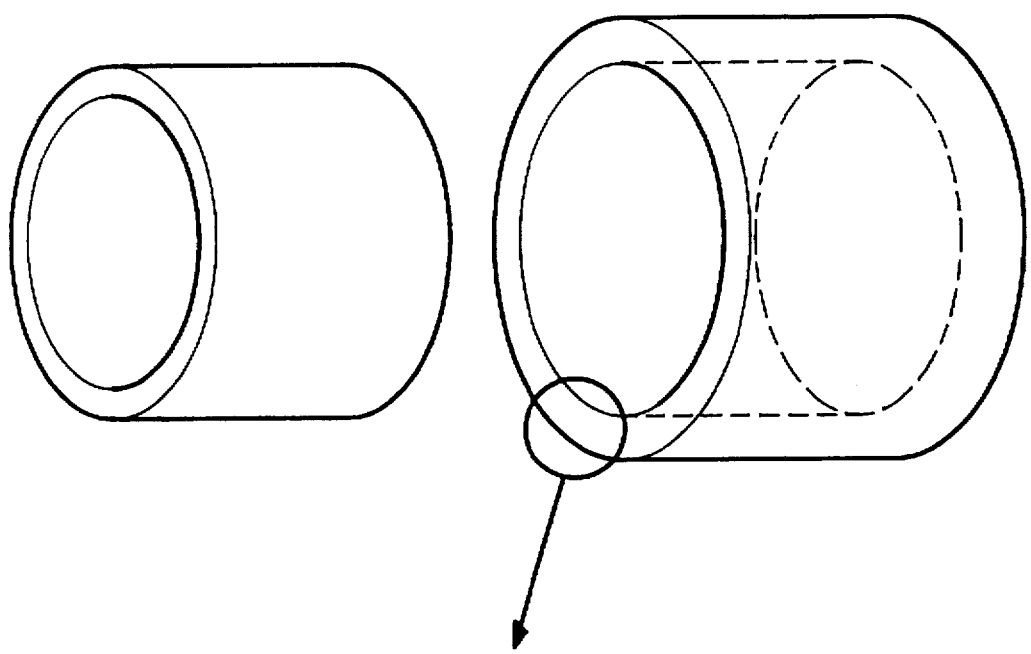
FIG. 2 is a perspective view to show the structure of a water absorbing sintered alloy block according to the present invention.
Figure 3:
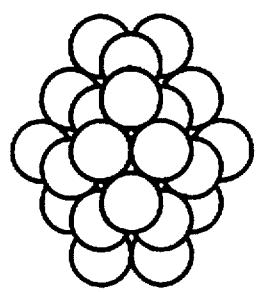
FIG. 3 is a perspective view to show a structurally curdled particles inside a sintered alloy block according to the present invention.
Figure 5:
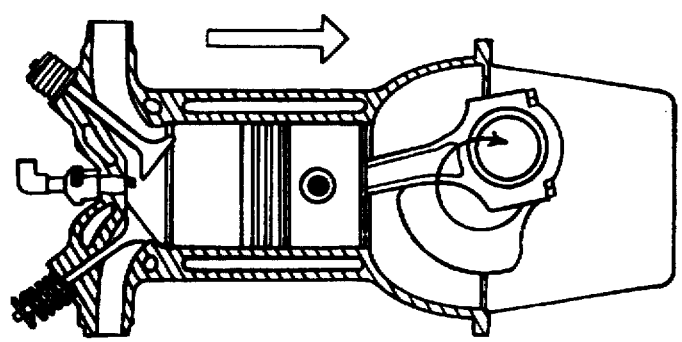
FIG. 5 is a sectional view to show the condition where the vapor being exhuasted from the engine.
Figure 4:
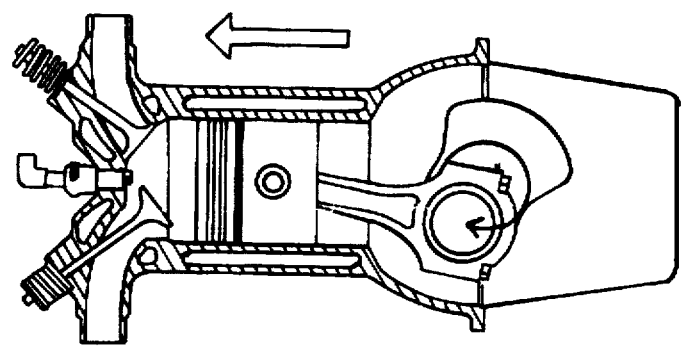
FIG. 4 is a sectional view to show the condition where the gas being fueled in the cylinder of a engine.

The most significant improvement of this invention is characterized in adapting a plurality of cup shaped water absorbing sintered alloy blocks 22 (see FIG. 2) spacedly arranged inside the electrolyzer 20, which are made of nickel alloy particles and moulded under high pressure and instant heat treatment in a high frequency furnace or by a maximum current instant short circuit discharging method at a temperature of about 1500°~2000° C. The particles of the nickel alloy inside the mould are so tightly arranged as each of them must contacts with at least twelve others on their outer peripheries (see FIG. 3) and punctures each other under above mentioned high pressure and high temperature prior to curdle into dimensionally different cup shaped blocks 22.

The electrolyzer 20 comprises a cylindrical housing 21 enclosed therein an elctrolytic sink 23 on the lower portion, an air cell 28 on the upper portion and a less diameter circular impurity trough 24 on the bottom communicated to the electrolytic sink 23 and an egress 25 for discharging the impurities from the sink 23. The electrolytic sink 23 has reinforced on the inner periphery a layer of heat insulation material and contains electrolyte and a plurality of the dimensionally different cup shaped water absorbing sintered alloy blocks 22 therein. The alloy blocks 22 are disposed upside down on the bottom of the sink 23 and arranged so as they are spacedly and sequentially encircled each other in the manner that the largest one of them is at the outmost position adjacent the inner periphery of the sink 23. A pair of 12-volt batteries are adapted as the power source 27 to electrically connect with the alloy blocks 22 inside the sink 23 in the manner that the first and the third layers of the blocks connect with a series of the anodes where the second and the fourth layers thereof connect with a series of the cathodes of the electrode. A grounding means 26 is also arranged in the circuit.

The air cell 28 on the upper portion of the housing 21 comprises a plurality of semi-circular drip plates 29 spacedly and alternately secured on their outward ends to the inner periphery of the cell 28 and their inward ends extended slantly toward the opposite side and terminated at a predetermined position, and a passage on the top near the edge of the housing 21 provided to perpendicularly connect with the central bottom of the segregator 30 for passing through the damp gas of the hydrogen and oxygen from the cell 28 into the segragator 30.

The segregator 30 comprises a cylindrical housing enclosed therein a roughly conical filter plate 31 on upper portion, an egress on central top, an ingress on central bottom and a L-shaped drain port 32 protruded outward at lower outer periphery for automatically eduction of excessive water therein under control of a detective device (not shown).

The acetone container 40 which respectively connects to the segregator 30 and the air valve 50 has an ingress for receiving in the dried gas of hydrogen and oxygen from the segregator 30 and an egress for the passage out of the purified gas to the air valve 50 and contains a predetermined amount of the acetone solution for decarbonizing and cooling down the dried gas when it passes.

The air valve 50 incorporated with a pressure control device 60 are under control of a micro computer (not shown) which is programmed to control the mixture ratio of the hydrogen and oxygen as well as their pressure is control the time of opening for the valve 50. When the gas in proper ratio is supercharged in the pressure control device 60 to a predetermined climax of pressure, the valve 50 is open to send the gas through the multi-point antibackfire device 70 to an intake 83 of an engine 80 and closed up until next climax of pressure. A switch off device (not shown) which is also under control of the computer is capable of detecting the leakage and the pressure of the gas and breaking up the current when comes up the hazard.

The potassium hydroxide (KOH) mixed in the electrolyte is of a non-toxic, non-erosion and medium alkaline solution and it's alkality will become weak when mixed with fresh water which is of a favorable condition for maximum electrolyzing, and because of that the molecule of the fresh water and KOH solution is sizably smaller than the crevices inside whole block 22 so that the blocks 22 are entirely permeable in the electrolyte to achieve a limitless electolytic contacting surface area. In addition to the catalytically active property of the nickel, adequate ionic hydrogen and ionic oxygen will be generated from the electrolyte when the power is set on in maximum current. Normally, the ionic oxygen trends to the anodes so as the ionic hydrogen trends to the cathodes of the electrode and then they conduct a neutralized reaction in the alloy blocks 22 prior to becoming a mixture of vaporized gas of hydrogen and oxygen belching from the outmost block 22 which is of a first filter to dehydrate the vaporized gas. The air cell 28 on the top of the electrolyzer 23 proceeds the second step of dehydration by the drip plates 29 therein, then the vaporized gas is passed through and entered into the segregator 30 for the final step of dehydration. The dried gas of hydrogen and oxygen flows continuously from the segregator 30 into the acetone container 40 for a decarbonizing and cooling off process prior to being sent out through the air valve 50, the pressure control device and the multi-point antibackfire 70 entered into the engine 80 which is of a generic type has cranks 81 and cylinders disposed therein. When the gas of mixed hydrogen and oxygen incorporated with fresh air is pressed in, it will be combusted and exploded in the cylinders 82 to run the engine 80 perfectly with out creating the waste gas except the vapor exhuasted out of the engine 80.

The recruiting unit 100 is the one of the important components in the electrolytic fueling system because of that the water is quite consumed in the electrolyte 23. Thus, the three port valve 15 incorporated with the automatic pump 12 are sensitive to the water level and the KOH ratio of the electrolyzer and timely pump the fresh water from the water tank 10 and the KOH solution from the KOH container 11 into the electrolyzer 23.

Based on the previously discussed improvement, the present invention of the electrolytic fueling system provides the following advantages:

a) a plurality of water absorbing sintered alloy blocks adapted to the electrolyzer therein providing a limitless surface contacting area in between the electrolyte and the electrode that generates a large amount of mixed gas of the hydrogen and oxygen.

b) it has three steps of dehydration devices which provide qualified dried gas of mixed hydrogen and oxygen acceptable to an engine of generic type.

c) an acetone container can provide decarbonized and cooling off gas combustible in an engine and protecting the engine from carbonaceous deposition.

d) a multi-point antibackfire device incorporated with an automatic switch-off device can protect the system from hazardous incidence, and e) potassium hydroxide (KOH) solution adapted to this system is of a less expensive and not frequently recruiting material, thus saves the fuel expense.

The scope of this invention should determined by the appended claims and their legal equivalents rather than by the examples given in aforediscussed description.

I claim:

1. An electrolytic fueling system for an engine comprising:

a recruiting unit, said unit comprising a fresh water tank, a KOH tank, an automatic pump and a three-port valve located at predetermined positions and connected by a plurality of conduits therebetween;

an electrolyzer connected to said three-port valve of said recruiting unit, said electrolyzer comprising a cylindrical housing having an electrolytic sink enclosed in a lower portion, said sink being reinforced with an insulator on an inner periphery thereof and contained therein a predetermined amount of electrolyte and a plurality of water absorbing sintered alloy blocks which are sequentially and spacedly nested and alternately interlocked with a series of anodes and cathodes of an external power source and a grounding member, an air cell located at the upper portion of said housing above said electrolyzer and an impurity trough having an egress thereon integrated with the bottom of said electrolytic sink;

a segregator connected to the top of said electrolyzer by a passage therebetween, said segregator comprising a cylinder housing, a conical filter member on an upper portion therein, an ingress centrally formed on the bottom communicated with said passage, an egress formed at the top center thereof and an L-shaped drain port protruding outwardly at a lower outer periphery therefrom;

an acetone centainer connected with said segregator and an automatic air valve respectively, said container comprising an ingress and an egress at two ends, and a predetermined amount of acetone solution contained therein;

said automatic air valve incorporated with a pressure control member and connected with said acetone container and an antibackfire member therebetween having a switch off device therein;

whereby, sufficient vaporized mixed gas of hydrogen and oxygen generated from said electrolytic sink is sequentially dehydrated through an outer most alloy block, said air cell and said segregator, then decarbonized at said acetone container therein, prior to entry into a generic combustion engine under control of said automatic valve.

2. An electrolytic fueling system according to claim 1, wherein said air cell comprises a plurality of semi-circular drip plates spacedly and alternately secured at their outward ends to the inner periphery of said electrolyzer and extended slantly to terminate at predetermined positions.

3. An electrolytic fueling system according to claim 1, wherein said electrolyte is composed of the fresh water and the potassium hydroxide (KOH) solution in predetermined proportion.

4. An electrolytic fueling system according to claim 1, wherein said water absorbing sintered alloy blocks are cup shaped having dimensional decrease in progressive order.

5. An electrolytic fueling system according to claim 1, wherein said plurality of water absorbing sintered alloy blocks are disposed upside down on the bottom of said electrolytic sink therein and spacedly and sequentially nested within each other with the largest one of said blocks at an outermost position.

6. An electrolytic fueling system according to claim 1, wherein said water absorbing sintered alloy block is made of nickel alloy particles and moulded under high pressure and instant heat treatment at a temperature of about 1500°~2000° C.

7. An electrolytic fueling system according to claim 6, wherein said nickel particles are so tightly moulded within said block as each one of said particles must peripherally contacting at least twelve others and mutually puncturing each other prior to curdle into said block.

8. An electrolytic fueling system according to claim 6, wherein said absorbing sintered alloy block has crevices in entire body thereof having dimensionally larger than that of the molecules of said electrolyte.

9. An electrolytic fueling system according to claim 1, wherein said external power source is a pair of 12-volt batteries.

* * * * *